United States Patent [19]

Bergman

[11] 4,359,309
[45] Nov. 16, 1982

[54] METHOD FOR TRANSFERRING A WORKPIECE IN AN AIR FLOAT SYSTEM

[76] Inventor: Raymond A. Bergman, 107 E. Second St., Minster, Ohio 45865

[21] Appl. No.: 155,205

[22] Filed: Jun. 2, 1980

Related U.S. Application Data

[60] Division of Ser. No. 1,434, Jan. 8, 1979, which is a continuation-in-part of Ser. No. 924,958, Jul. 17, 1978, Pat. No. 4,179,106, which is a continuation of Ser. No. 815,676, Jul. 14, 1977, abandoned, which is a division of Ser. No. 684,725, May 10, 1976, Pat. No. 4,058,885.

[51] Int. Cl.³ .............................................. B60V 1/00
[52] U.S. Cl. .................................................. 414/786
[58] Field of Search ............... 414/786, 676, 607, 608, 414/787, 750, 749; 29/559, 563; 408/56, 67, 69, 76; 406/87, 88; 410/68, 72–76, 105, 107, 111; 248/500, 507, 508, 509, 680, 681; 198/345, 472; 269/20, 99, 100, 321 A; 328/DIG. 1, DIG. 9; 269/34

[56] References Cited

U.S. PATENT DOCUMENTS

| | | | |
|---|---|---|---|
| 3,141,706 | 7/1964 | Curtesuis | 302/29 |
| 3,209,623 | 10/1965 | Schardt | 77/64 |
| 3,272,359 | 9/1966 | Thomas et al. | 414/676 X |
| 3,457,874 | 7/1969 | Tezuka et al. | 414/676 X |
| 3,948,344 | 4/1976 | Johnson et al. | 414/676 X |
| 4,014,576 | 3/1977 | Druschel | 302/31 |

*Primary Examiner*—Douglas C. Butler
*Attorney, Agent, or Firm*—Gust, Irish, Jeffers & Hoffman

[57] ABSTRACT

A method for transferring a workpiece fixture from one supporting table to another in an air float system. The workpiece is mounted to a workpiece fixture, which in turn is supported on the upwardly facing surface of either a stationary air float table or a movable air float plate. The movable air float plate, which may be mounted on a vehicle, such as a forklift, or itself supported on a cushion of pressurized air, is moved into abutment with the stationary table. The air float system is then activated so as to establish a cushion of pressurized air between the fixture and its supporting surface, and the fixture is slid from one surface to the other on the cushion of air in a substantially friction-free manner. The movable plate or table is then retracted away from the stationary table and the workpiece may be positioned thereon for machining or any other operation which is desired. According to one embodiment of the invention, only the stationary table is supplied with pressurized air and the movable plate is normally exhausted. When the movable plate is brought into engagement with the stationary table, ball check valves in aligned fluid passageways open so as to permit pressurized air from the stationary table to charge the air float system of the movable plate. When the plate and stationary table are disengaged, the plate will again be exhausted so that workpieces supported thereon cannot slide off.

4 Claims, 19 Drawing Figures

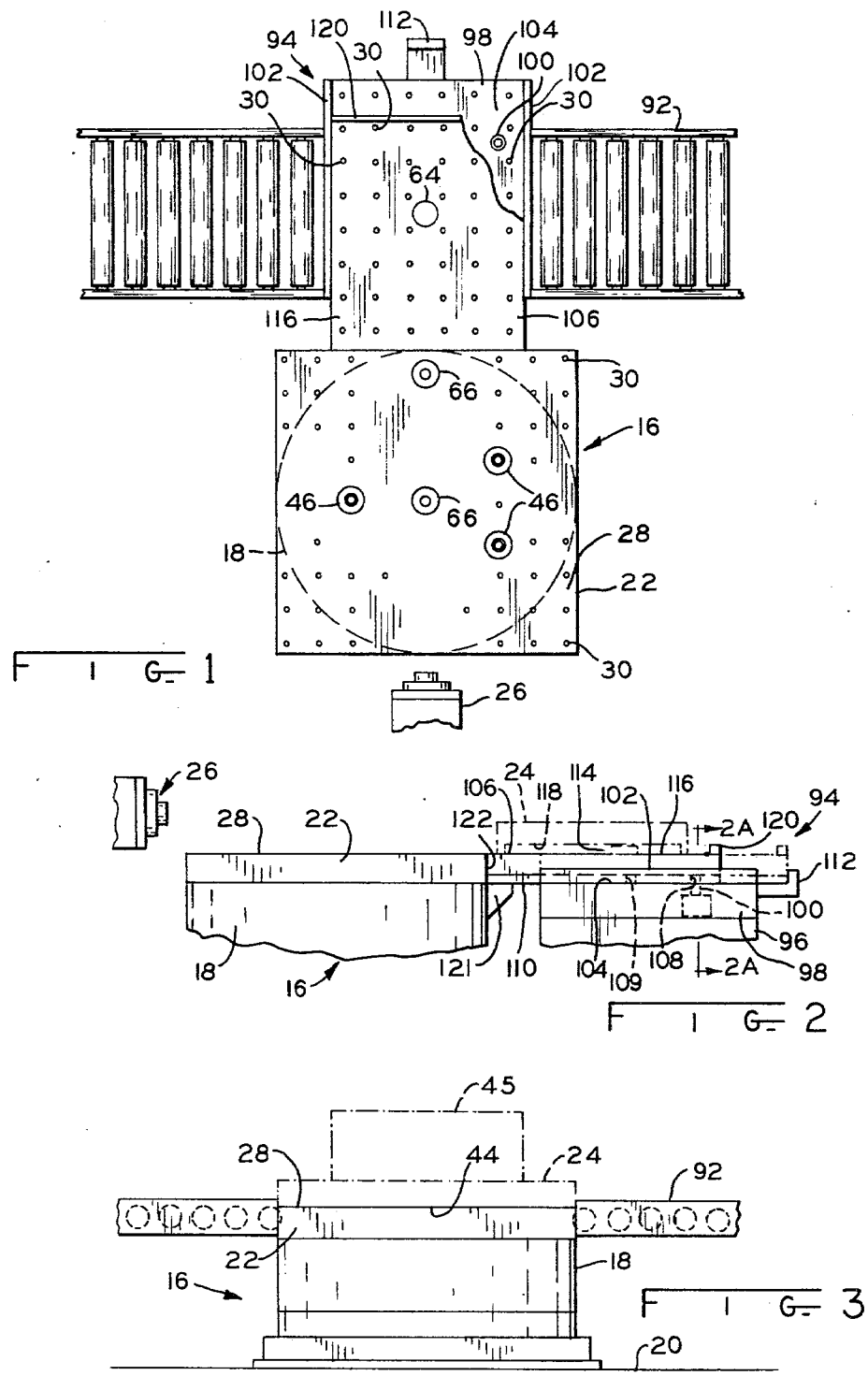

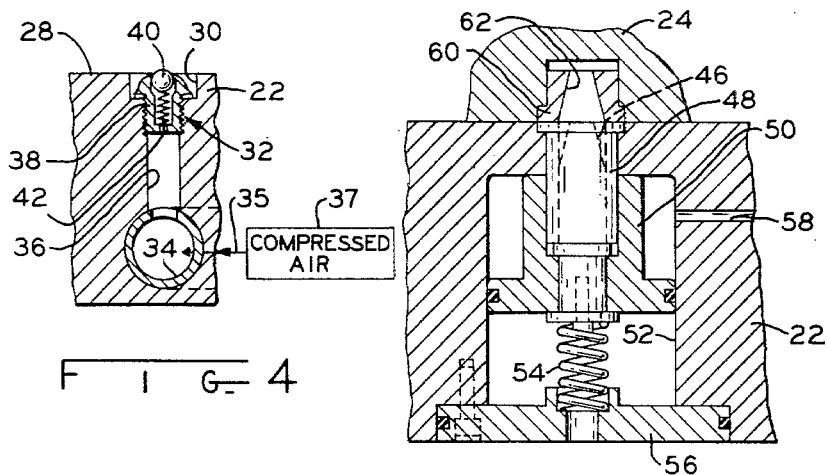
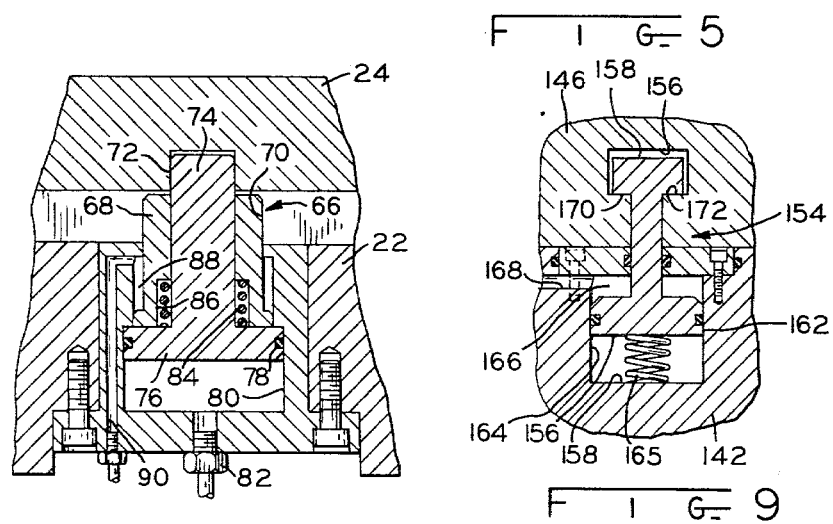
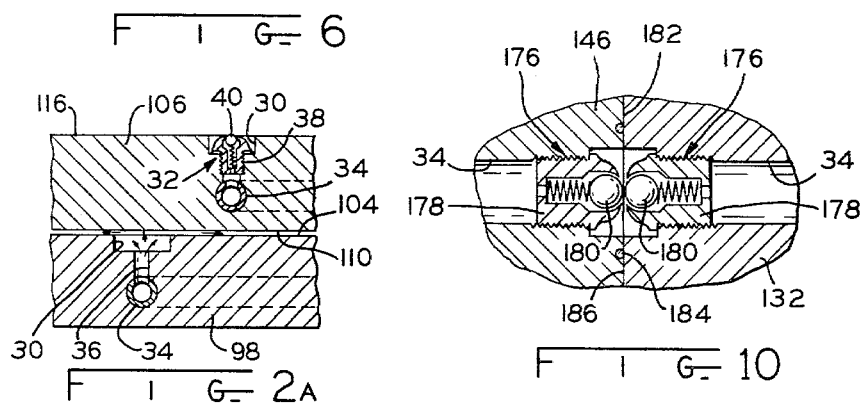

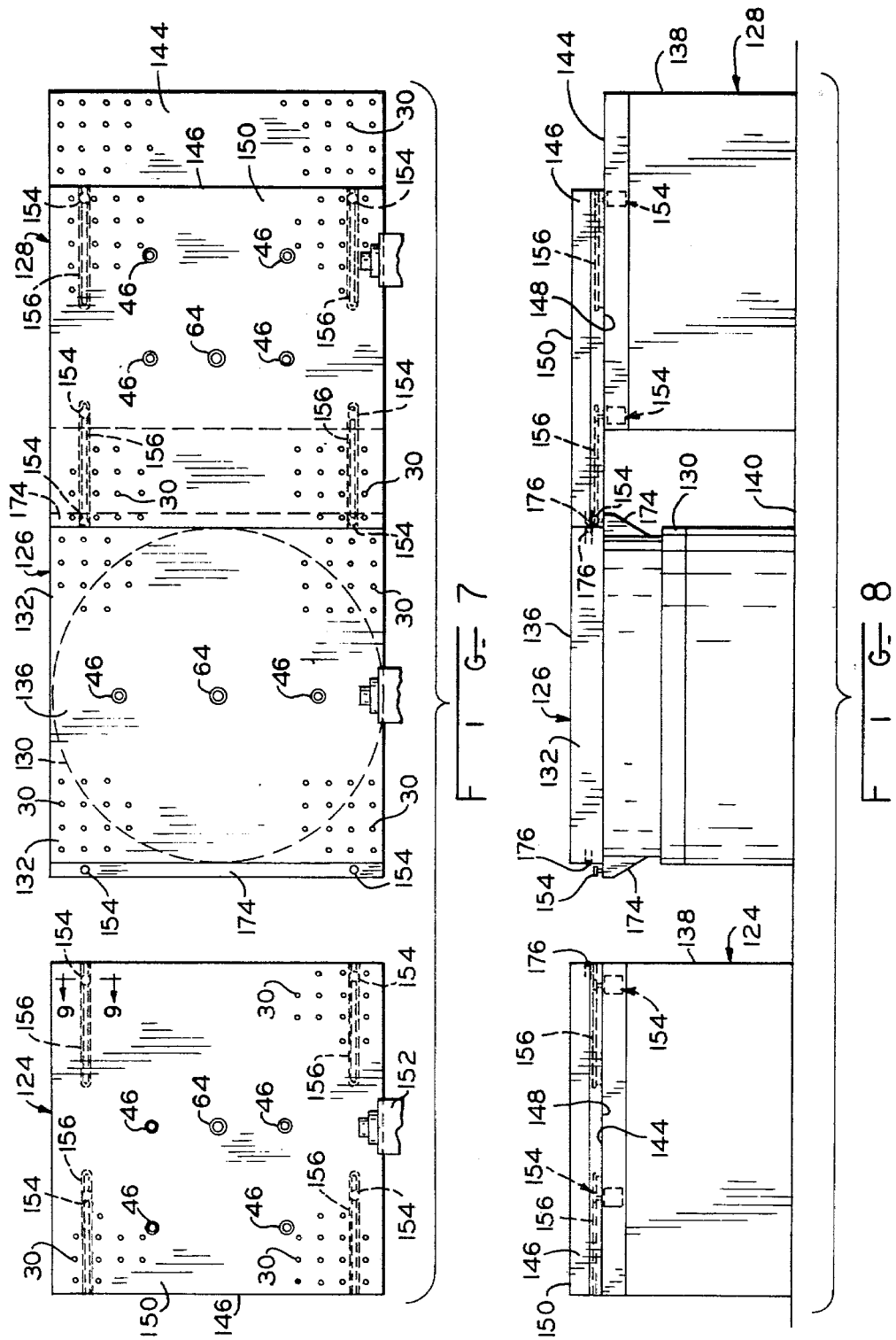

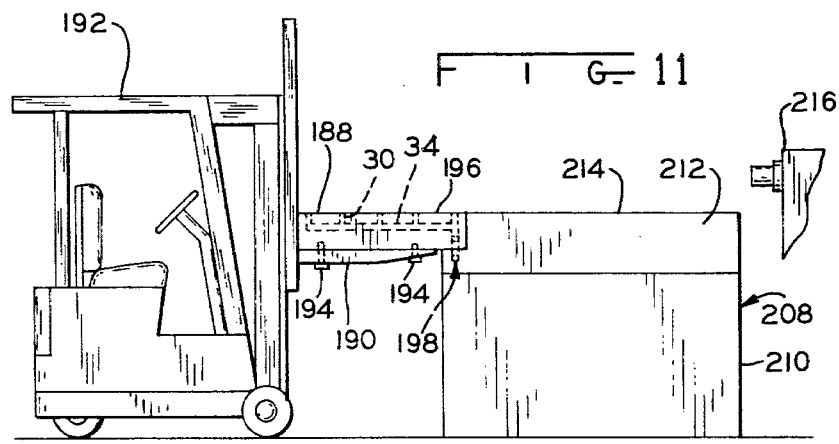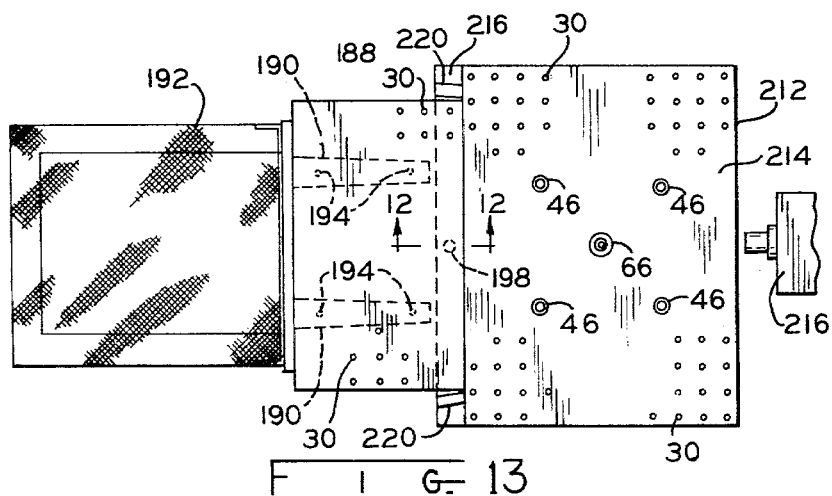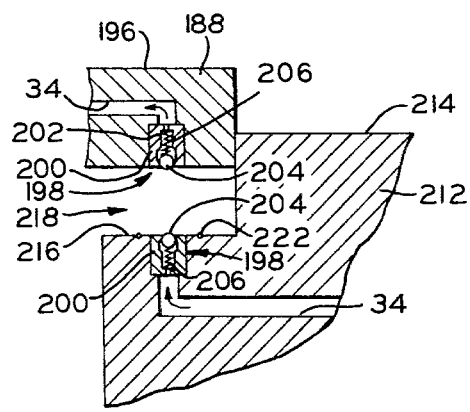

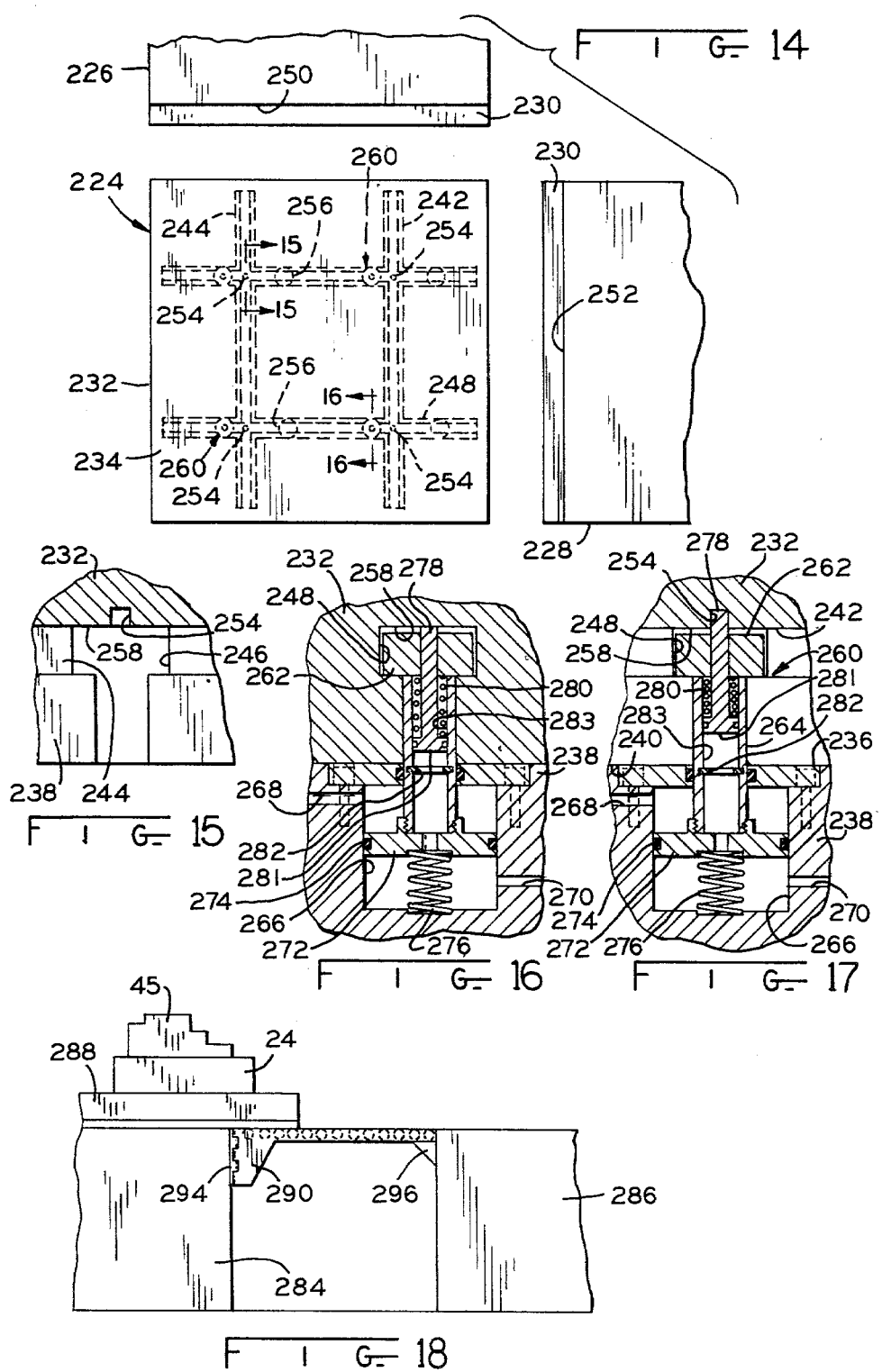

METHOD FOR TRANSFERRING A WORKPIECE IN AN AIR FLOAT SYSTEM

CROSS REFERENCE TO RELATED APPLICATIONS

This application is a division of application Ser. No. 001,434, filed Jan. 8, 1979, which is a continuation-in-part of application Ser. No. 924,958, filed July 17, 1978, now U.S. Pat. No. 4,179,106, which is a continuation of application Ser. No. 815,676, filed July 14, 1977, now abandoned, which is a division of application Ser. No. 684,725, filed May 10, 1976, now U.S. Pat. No. 4,058,885.

BACKGROUND OF THE INVENTION

The present invention relates to a method for transferring workpieces from one supporting table to another, and in particular to an air float transfer system wherein the workpiece is transferred from one air float table to another. Although the system is adapted for use in a variety of applications, it is most particularly suited for use in a machine tool environment wherein it is necessary to move parts in and out of a number of machining and forming stations.

In the past, the machining of large workpieces involved very difficult positioning and repositioning of the workpiece when the various portions thereof are machined. In many cases, it is necessary to use hoists for elevating and moving the workpiece about both to and from the machine tool table, and on the table itself where repositioning is necessary for sequential machining steps.

In order to overcome these problems, an air float system, wherein the workpiece is mounted to a fixture which in turn is supported on a film of pressurized air, has been developed. This system is described in detail in U.S. Pat. No. 4,053,885 in the name of Raymond A. Bergman, which patent is incorporated herein by reference. In the system, a table is provided with fluid passages and a plurality of fluid outlets distributed over the surface of the table so that a cushion of pressurized air may be provided underneath the workpiece fixture. By virtue of the fluid pressure film, substantially friction-free movement of the fixture on the table is possible thereby permitting positioning and repositioning to be accomplished by a single operator without the need for hoisting equipment.

In order for the fixture to be rotated and translated from one position to another, the table is provided with one or more retractable pivot pins which project upwardly from the table surface. The pins may either be received in a socket in the bottom of the fixture, in which case the fixture is constrained to move circularly on the table, or, alternatively, they may be received in one or more slots so that the fixture is not only rotatable but also translatable. Cooperating pairs of retractable pin and socket locating devices on the fixture and table provide for accurate location of the fixture in a variety of predetermined positions. Clamps may also be provided for clamping the fixture in the desired positions during machining. The clamps may either be of the conventional T-slot type, or, alternatively, of the bayonet type as described in U.S. Pat. No. 4,174,828 in the name of Raymond A. Bergman.

The table may be provided with a dual centering pin feature if additional flexibility is desired in positioning and locating the fixture. The dual centering pin comprises an outer pin which is engageable with the fixture slots, and an inner pin received within the outer pin with means for causing the inner pin to extend upwardly out of the outer pin so as to engage holes in the slots. When the inner pin is retracted, the workpiece fixture is translatable on the table in engagement with the outer pin, and when the inner pin is extended and received within one of the fixture holes within the slots, the fixture may be rotated about it to the desired position.

Although the prior developments of the air-float system as described above have greatly facilitated the positioning and repositioning of workpieces within the tool station, it was still necessary for large traveling hoists to be used for transferring the workpiece to the machine tool station, and then removing it after all of the machining steps have been accomplished. Furthermore, multiple machining steps often necessitates the movement of the workpiece to two or more machining stations, which, although they may be in fairly close proximity, are not contiguous so that a hoist must again be used to lift the workpiece and move it to the next station. This results in substantial machine down time because the operator must wait for the hoist to become available to remove the machine part, and then wait again for the hoist to deliver the next part for machining. Another drawback is the inherent danger in lifting and transporting extremely heavy workpieces above the working area.

Although positioning the work tables for adjacent machining stations in close proximity to one another with their upper surfaces contiguous may solve the problem of moving the workpiece from one station to the next without relying on a traveling hoist, such a solution is limited in its applications. For example, when rotary tables are used, it is not possible for adjacent tables to be in close proximity due to the need for clearance. Furthermore, it is often desirable for machining tables to be spaced from one another by an aisle so that other equipment, such as gantry cranes, or the like, may pass therebetween. The use of a very large air float table is inefficient in the situation where only one of the machining stations which it services is used.

SUMMARY OF THE INVENTION

In order to overcome the disadvantages of the prior art systems and increase the flexibility of the previously developed air float system, the present invention is concerned with a method and apparatus for enabling two air float tables to be temporarily moved together so that a workpiece on one may be easily transferred to the other. In one embodiment of the invention, a dual plate air float table is positioned adjacent a mechanical conveying system so that parts may be transferred from the conveying system directly on the movable air float plate, which is then floated on a cushion of air supplied by the underlying plate and moved into abutment with a fixed position air float plate at the machining station. When a cushion of air is established between the fixture plate and the movable air float plate, the part may be slid onto the fixed position plate where it will be accurately positioned and repositioned for machining.

In another embodiment, an exhausted air float plate is secured to a wheeled vehicle, such as to the forks of a forklift truck, and parts are loaded thereon by any conventional means. The part is then transported by the forklift truck to the machining station, the plate is moved into abutment with the air float plate in the machining station so that the upper surfaces of the respective plates are in vertical register, the truck-mounted plate is charged with pressurized air from the fixed position air float table, and the part is slid off the truck-mounted plate onto the fixed position table for accurate positioning and machining. A ball check valve arrangement opens when the air float plates are brought into engagement so that the truck-mounted plate can be charged.

In a third embodiment of the invention, a plurality of air float tables are provided, with each defining a separate machining station. Some of the tables are provided with the dual plate air float system so that the upper plate may be floated over into abutment with a fixed position table. After machining of the part on the first table, it may then be transferred to the second table without the need for a traveling crane or any other mechanical lifting device. From the second table, the part could be transferred to another table by the same technique. This arrangement is particularly advantageous where one of the tables is a rotary index table and requires a certain amount of clearance on the sides thereof so that it can be rotated.

According to a fourth embodiment of the invention, a dual plate air float table is provided wherein the upper plate is confined to rectilinear movement about a pair of orthogonal horizontal axes. Such a table could be located between a gantry crane and another air float table or a conveyor system, with a gap on either side thereof so that the gantry crane can pass through from one side to the other. The double axis table could be translated in one direction to the conveyor system leading into the plant, and in the other direction to an inspection station, or other machining station which also includes an air-float table.

This type of system has a large number of uses in a machining environment. For example, where three separate machining stations are utilized for smaller parts, a plurality of spaced apart air-float tables could be utilized with a floor-type mill moving from one station to the next. This would enable the operator to locate and clamp the part on one table while the mill is machining on the next. The multiple-table arrangement is also advantageous in situations where large workpieces are machined because three separate tables could be transformed into one large table by moving the end tables inward and locking them in place. Another application would be for the two side stations to act as receiver pods, the first receiving a fixture plate with a part to be machined and held in an air-exhausted mode until it is needed. The third station would act as a receiving pod for finished parts. When the part has been machined, the receiving table would be translated to the center station, automatically charged with air, and then the fixture plate translated onto it. The receiving table would then be moved away and the air exhausted therefrom. The part to be machined would be translated to the center work station by the first table in a similar manner. Since the traveling crane for the plant would simply be required to make one move to deliver a plurality of parts and at the same time pick up the machined ones and move them on, the machining spindle down time could be substantially reduced.

Specifically, the workpiece transfer system according to the present invention comprises: a support table having an upper surface adapted for supporting a workpiece of workpiece fixture and means within the table for supplying a cushion of workpiece or fixture supporting pressurized fluid to the surface of the first table whereby a workpiece or workpiece fixture may be floatingly supported thereon, a movable support element having an upper surface adapted for supporting a workpiece or workpiece fixture and means within the element for supplying a cushion of workpiece or workpiece fixture supporting pressurized fluid to the support element surface whereby a workpiece or workpiece fixture may be floatingly supported thereon, and means for moving the support element toward the support table such that the respective upper surfaces thereof are in vertical register whereby a workpiece or workpiece fixture may be slid from the upper surface of either the table or element to the upper surface of the other, and for moving the support element away from the table when the workpiece or workpiece fixture has been thus transferred from one to the other.

The method according to the present invention comprises the steps of: providing a first table having an upwardly facing upper surface on which the fixture is supported, providing a second table spaced from the first table and having an upwardly facing surface, moving one of the first and second tables toward the other until the tables are in close proximity with the upper surfaces thereof in vertical register, establishing a cushion of pressurized air between the upper surface of the first table and the fixture so as to floatingly support the fixture for substantially friction-free movement, and sliding the fixture on the cushion of air from the first table to the second table while at the same time providing a cushion of pressurized air between the fixture and the second table upper surface to floatingly support the fixture as it is moved onto the second table.

It is an object of the present invention to provide a method for transferring a workpiece in an air float system wherein an air float table is moved into close proximity with another air float table and the workpiece is floated from one to the other on a cushion of pressurized air.

It is a further object of the present invention to provide a workpiece transfer system easily incorporated into existing machine tool environments, both of the conventional and air float type.

These and other objects of the present invention will become apparent from the detailed description considered together with the accompanying drawings.

BRIEF DESCRIPTION OF THE DRAWINGS

FIG. 1 is a plan view of an air float system and conveyor according to the present invention;

FIG. 2 is a side elevational view thereof;

FIG. 2A is a fragmentary sectional view taken along line 2A—2A of FIG. 2;

FIG. 3 is an end elevational view thereof;

FIG. 4 is a partially schematic enlarged fragmentary sectional view taken through the air float table and showing one of the ball check valves through which pressurized air is supplied to the surface of the table;

FIG. 5 is an enlarged fragmentary sectional view taken through the table and fixture showing a locating pin and socket;

FIG. 6 is an enlarged fragmentary sectional view taken through the table and fixture showing a dual centering pin;

FIG. 7 is a plan view of a three table air float transfer system according to the present invention;

FIG. 8 is a side elevational view thereof;

FIG. 9 is an enlarged fragmentary sectional view taken through a dual plate embodiment of the invention showing a T-clamp;

FIG. 10 is an enlarged fragmentary sectional view taken through two abutting air float tables and showing ball check valves according to the invention;

FIG. 11 is a side elevational view of a forklift truck embodiment of the invention;

FIG. 12 is an enlarged fragmentary sectional view taken along line 12—12 of FIG. 13;

FIG. 13 is a plan view of the embodiment shown in FIG. 11;

FIG. 14 is a plan view of an air float table according to a further embodiment of the invention;

FIG. 15 is an enlarged sectional view taken along line 15—15 of FIG. 14;

FIG. 16 is an enlarged sectional view taken along line 16—16 of FIG. 14;

FIG. 17 is an enlarged sectional view similar to FIG. 16 wherein the center pin is received in one of the locating openings; and FIG. 18 is a side elevational view of a further embodiment of the invention.

DETAILED DESCRIPTION

Referring now to the drawings in greater detail, FIGS. 1-3 illustrate a rotary machine tool table 16 comprising a base 18 bolted to the shop floor 20, and having an air float plate 22 generally of the type disclosed in the aforementioned U.S. Pat. No. 4,058,885 mounted thereon. Table 16 is positioned adjacent machine tool head 26, which may be a boring head, milling head, or the like.

The upper surface 28 of plate 22 is provided with a plurality of openings freely distributed over its surface and having small check valves 32 of the type shown in FIG. 4 received therein. With reference to FIG. 4, plate 22 is provided with a network of air passages 34 communicating with a supply conduit 35 outside table 16 connected via a control valve (not shown) with a supply of fluid under pressure 37, such as air supplied from an air compressor (not shown). Extending vertically upward from passages 34 are connection passages 36, which are in fluid communication with openings 30 in the upper surface 28 of plate 22.

The upper end of each connecting passage 36 is closed by a valve 32 comprising a body 38 threaded into the upper end of passage 36, the top thereof being disposed below the level of surface 28 so that no obstructions are presented to the workpiece fixture supported thereon. A steel ball 40 is captured and seated within body 38 and urged into its closed and seated position by spring 42. Ball 40 projects upwardly beyond surface 28 a slight distance so that it will be contacted and unseated by the fixture as it passes thereover. This will permit pressurized fluid to flow through body 38 to the surface 28 of plate 22 thereby establishing a fluid film between the upper surface 28 of plate 22 and the lower surface 44 of fixture 24. The cushion of air will floatingly support fixture 24 so that the fixture-workpiece combination can easily be moved about on table 16. It is preferred that fixture 24 be in the form of a suitably dimensioned plate having a generally flat lower surface 14 and means on the upper surface thereof so that the workpiece 45 may be clamped or otherwise secured thereto.

Plate 22 is also equipped with a plurality of locating pins 46 which are located in accurately determined positions on plate 22 so that the fixture 24 may be accurately located. Referring to FIG. 5, tapered locating pin 46 is slidably received within bushing 48 and connected to piston 50. Piston 50 reciprocates within bore 52 and is biased upwardly by spring 54, bore 52 being closed at its lower end by vented plate 56. In order to retract pin 46, fluid pressure is admitted to bore 52 through passageway 58. Fixture 24 is provided with a plurality of accurately located bushings 60 having tapered inner surfaces 62 adapted for the seating of pin 46 therein.

Plate 22 is also provided with one or more translation or centering pins 64, one of which is illustrated in detail in FIG. 6. Pins 64 may be of the dual centering type of the general type disclosed in U.S. Pat. No. 4,143,868. Centering pin 66 comprises an outer pin 68 which is slidably received in bore 70 and an inner pin 72 comprising a smaller diameter upper portion 74 and a flange 76 provided with annular seal 78. Inner pin 72, by virtue of flange 76 which serves as a piston, is reciprocally received within bore 80 and is extended by fluid pressure, either hydraulic or pneumatic, admitted into bore 80 through fluid line 82. A compression spring 84 is disposed between flange 76 and a counterbore 86 in outer pin 68. Spring 84 serves to extend outer pin 68 upwardly when inner pin 72 is also extended. Outer pin 68 is retracted by means of fluid pressure admitted to annular chamber 88 through fluid passageway 90. Pins 68 and 72 are preferably slightly tapered on their distal ends to compensate for any misalignment with the translation slots and rotation openings (not shown) on the lower surface 44 of fixture 24.

Returning to FIGS. 1-3, table 16 is located near a mechanical roller conveyor 92, and a dual plate air float transfer table 94 extends between two sections of conveyor 92. Transfer table 94 comprises a base 96 mounted to the shop floor 20 and an air float plate 98 mounted thereon. Plate 98 is provided with a plurality of openings closed by ball check valves 32, and at least one locating pin 100 of the same type as locating pin 46. Side rails 102 are rigidly connected to plate 98 and extend from the rear edge of plate 98 to the forward edge thereof.

Slidably supported on the upper surface 104 of air float plate 98 is a second air float plate 106 dimensioned such that it is guided by side rails 102. Upper plate 106 includes at least two tapered sockets 108 and 109 in the lower surface 10 thereof into which locating pin 100 will project when the upper plate 106 is in extended and retracted positions, respectively. A rear retaining stop 112 limits the rearward movement of plate 106. A retractable translating pin 114 is mounted within the upper surface 116 of plate 106 and is intended to be received within a downwardly opening slot 118 in fixture 24. A rear rail 120 limits the rearward movement of fixture 24 in the event that translating pin 114 is retracted.

In operation, the fixture 24 carrying workpiece 46 would be rolled down conveyor 92 and slid onto upper transfer plate 106. As fixture 106 engages and depresses the balls 40 closing the fluid passageways 36 and openings 30, pressurized air will be introduced between the lower surface of fixture 24 and the upper surface 116 of transfer plate 106 so that the fixture 24 may be moved completely onto transfer plate 106 virtually friction free. During this operation, upper transfer plate 106 is in the rearward dotted line position (FIG. 2) with locating pin 100 seated within tapered socket 109 so as to lock plate 106 in the retracted position.

Plate 106 is then exhausted so that fixture 24 ceases to float, and a cushion of pressurized air is established between the upper surface 104 of lower, stationary plate 98 and the lower surface 110 of upper plate 106. Locating pin 100 is then retracted and upper plate 106 pushed toward table 16, carrying fixture 24 with it. After plate 106 begins to move toward table 16, locating pin 100 can again be actuated and it will be urged against the lower surface 110 of upper plate 106. When socket 108 is aligned therewith, at which point plate 106 will be supported on ledge 121 in close proximity to or in contact with the side 122 of table 16, pin 100 will project into socket 108 thereby locking plate 106 in place. Plates 22 and 106 are then supplied with pressurized air so that fixture 24 is able to be slid toward table 16 until the first centering/translating pin 64 is able to be projected into fixture slot 118. Pin 114 will then be retracted and the fixture 24 moved completely onto plate 22 whereupon it will be captured by the second centering pin 66 and released by the first pin 64. Fluid pressure is then again established between plates 98 and 106, and plate 106 is retracted to the dotted line position of FIG. 2. This will permit plate 22 to be rotated by the rotary index mechanism of table 16 so that the desired machining by tool 26 may be performed. When the machining has been completed, plate 106 is again advanced, the fixture 24 is moved onto plate 106, plate 106 is retracted, and the part is moved back onto conveyor 92 for movement to the next station.

With reference now to FIGS. 7, 8 and 9, an embodiment of the invention suitable for multiple station machining where the machining of a plurality of small parts is illustrated. It comprises three air float tables 124, 126 and 128, which are spaced apart and arranged in a linear fashion. Table 126 is a rotary index table similar to table 16 shown in FIG. 1 and comprises a base 130 on which base plate 131 is rotatably mounted. Plate 132, which is mounted to plate 131, comprises a plurality of openings 30 closed each by ball check valve 32. Openings 30 are distributed over the upper surface 136 of plate 132 so that a cushion of pressurized air can be established between it and the fixture 24 (FIG. 2). Also mounted in plate 132 are two locating pins 46 and a translation/centering pin 64, which are identical to the elements having the same reference numerals in FIGS. 1–3.

Tables 124 and 128 are virtually identical, merely being the mirror images of each other. For the sake of simplicity, only table 124 will be described, with table 128 having the corresponding elements with identical reference numerals. Table 124 comprises a base 138 mounted to the shop floor 140, a lower air float plate 142 bolted to base 138 and having a plurality of openings distributed over its upper surface 144. The structure of lower air float plate 142 is very similar to plate 98 in FIGS. 1–3. An upper transfer air float plate 146 is slidably supported on its lower surface 148 on the upper surface 144 of lower plate 142 and has an upper surface 150 provided with ball check valve closed openings 30, locating pins 46 and a translation/rotation pin 64. It should be noted that pin 64 may be of the dual type 66 shown in FIG. 6. A machine tool head 152 is shown positioned at table 124.

Upper transfer plate 146 is capable of being floated on a cushion of pressurized air established between its lower surface 148 and the upper surface 144 of lower plate 142 and is guided for rectilinear movement to the left and right as viewed in FIGS. 7 and 8 by virtue of T-clamps 154 mounted within lower plate 142 and received within T-slots 156 in upper plate 146. A T-clamp 154 is shown in detail in FIG. 9 and comprises an enlarged head portion 158 received within T-slot 156, a shank portion 160 extending downwardly through T-slot 156 and a piston 162 connected to shank portion 160 and reciprocally received within bore 164. Clamp 154 will be urged upwardly so that it is loosely received within T-slot 156 by means of return spring 165, which is disposed between the lower surface 156 of piston 162 and the floor 158 of bore 164. In order to clamp upper plate 146 to lower plate 142, fluid pressure, either pneumatic or hydraulic, is admitted to chamber 166 through passageway 168. This causes the shoulder 170 of upper portion 158 to frictionally engage the shoulder 172 of slot 156 so as to lock upper plate 146 against horizontal movement. It will be noted that four such T-slots 156 are provided, each having a T-clamp 154 disposed therein.

Center table 126 is provided with a pair of ledges 174 each having a pair of T-clamps 154 extending upwardly therefrom. Clamps 154 are extended and retracted by the same means as in tables 124 and 128, and are aligned such that when plates 146 are moved against plate 132, the clamps 154 will be received within the corresponding slots 156.

In the case where tables 124, 126 and 128 are utilized as successive machining stations for different machining steps to be performed on the same part, the workpiece fixture, such as fixture 24, including its attached workpiece 46 are loaded on plate 146 by means of a gantry crane, conveyor, etc., and the air supplied to plate 146 is activated so that the fixture may be accurately located by means of locating pins 46 and/or pins 64. After machining, the lower air float plate 142 is activated so that upper plate 146 will float thereon. Clamps 154 are released, and the upper plate 146 is slid to the right until the rightmost end is supported on ledge 174. Clamps 154 are then retracted, the pressurized air supply for plate 132 is opened, and the fixture 24 is slid from plate 146 onto plate 132. The fixture 24 is accurately located by means of locating pins 46 and centering pin 64, the air supply to plate 132 is closed and machining can begin. It should be noted that this machining may include the rotation of plate 132, so it will be necessary to retract plate 146 to the position shown in FIGS. 7 and 8.

At the same time, another workpiece-containing fixture 24 is loaded on plate 146 and is accurately located for machining as before.

When the machining on center table 126 has been completed, the lower plate 142 for table 128 is supplied with pressurized air so that upper plate 146 may be slid to the left and be clamped by the clamps 154 on center table 126. The fixture 24 previously engaged by the locating pins 46 on table 126 will be released, the supply of pressurized air to center table 126 opened, and the fixture 124 and its workpiece slid to the right onto the upper plate 146 of table 128, which has had the supply of pressurized air thereto opened. Upper plate 146 of table 128 is again floated on the cushion of air reestablished between its lower surface 148 and the upper surface 144 of lower plate 142, clamps 154 on center table 154 are released, and the upper plate 146 of table 128 is slid to the right and locked into place by the clamps 154 thereon.

This process continues with either a single operator of a number of operators performing the locating, transferring and machining steps. If it is desired to machine a large workpiece requiring more than a single table, the two end tables 124 and 128 may be shifted to the center to join center table 126, and then locked in place.

As mentioned in the introductory portion of the application, it may be desirable to utilize the end tables 124 and 128 as receiving pods, in which case they would simply store incoming and outgoing parts to be machined on the center table 126. In this case, it is not necessary for pressurized air to be supplied to upper plates 146 except during transfer of the workpiece containing fixtures 24 to or from them. Accordingly, the pressurized air supply system, such as passageways 34, may be normally exhausted with only the center table 126 having an active supply of pressurized air. With reference to FIG. 10, upper plate 146 has its fluid passageway 34 closed by means of a ball check valve 176 comprising a body 178 and a ball 180 captured by and seated therein in a manner very similar to the valve shown in FIG. 4. Ball 180 protrudes slightly beyond the edge 182 of plate 146 so that it will be opened when contacted by a similar valve 176 mounted within plate 132 for the center table 126 and closing off the passageway 34 supplying pressurized air to the surface 136 of plate 132. An O-ring 184 may provide a fluid-type seal when the respective edges 182 and 186 of plates 146 and 132, respectively, are in facing abutment. With plates 146 and 132 in this position, one or both of balls 180 will be unseated thereby permitting pressurized air from passage 34 in plate 132 to flow into supply passage 34 in plate 146 and from there up through the passages 36 to check valves 32 leading to the surface 150 of plate 146.

In this case, unmachined parts or fixtures 24 having unmachined parts 46 clamped thereto are loaded on table 124 and transferred to center table 126 by floating upper plate 146 on a cushion of air between it and lower plate 142 and then sliding it to the right into abutment with center plate 132 as described above. When ball check valves 176 for the respective plates 146 and 132 come into contact, pressurized air is supplied to plate 146 thereby enabling one of the parts to be slid over onto plate 132. Plate 146 is then unlocked and slid back to the position shown in FIGS. 7 and 8. After machining, the part on center table 126 will be transferred to the other end table 128 by a similar procedure.

FIGS. 11, 12 and 13 illustrate the forklift truck embodiment of the invention. An air float plate 188 is shown bolted to the forks 190 of forklift truck 192 by means of bolts or screws 194. Plate 188, which is very similar to the upper air float plates previously discussed, such as plates 146 and 106, has a generally planar upper surface 196, a plurality of openings 30, which are closed by ball check valves 32 (FIG. 4), and a network of air passageways 34. At the forward end of plate 188, which overhangs forks 190, there is provided a ball check valve 198 comprising a body 200 screwed into plate 188 having a passageway 202 connected with the pressurized fluid supply passageway 34, and a ball 204 captured and seated within body 202 so as to close off passageway 202. If desired, a return spring 206 may be provided for the purpose of seating ball 204. Fluid passages 34 are not connected to a separate supply of pressurized air, but are normally exhausted so that plate 188 cannot be charged with pressurized air during transportation of a part from one place to another.

Fixed position air float table 208 is very similar to table 16, except that it is not a rotary table, and comprises a base 210 having an air float plate 212 mounted thereto. Plate 212 has the customary pressurized fluid supply openings 30, locating pins 46 and centering/translation pin 66 on its upper surface 214. Table 208 is positioned near a machine tool 216 so that a workpiece supported on surface 14 may be machined thereby. A step 218 (FIG. 12) is formed in the upper forward corner of plate 212 and dimensioned such that when plate 188 is lowered thereon the upper surfaces 196 and 214 of plate 188 and 212 will be in vertical register. A pair of guide rails 220 are provided on step 218 and positioned so as to guide plate 188 into the proper position for engagement with plate 212.

Plate 212 is also provided with a ball check valve 198 identical to valve 198 in plate 188, and connected to the fluid pressure supply passage 34, which in turn is connected to a source of compressed air 37. When plate 188 is lowered onto the upper surface 216 of plate 212, balls 204 engage each other and are unseated so that pressurized air may flow from the fluid passage 34 in plate 212 into the fluid passage 34 in plate 188 thereby charging plate 188. When this occurs, the workpiece or workpiece and fixture (not shown) supported on plate 188 may be slid on a cushion of air over onto the upper surface 214 of plate 212. Valves 198 ensure that plate 188 will not be pressurized unless it is perfectly seated on the step 218 in plate 212. When plate 188 is raised, it will be disconnected from the air supply from plate 212. If desired, an O-ring 222 may be provided in step 218 to seal the fluid connection between plates 188 and 212.

A dual plate, 4-way transfer table 224 is shown in FIGS. 14–17 positioned adjacent two orthogonally arranged air float tables 226 and 228, each having support ledges 230 similar to ledges 174 in FIG. 8. Table 224 comprises an upper transfer plate 232 having a planar upper surface 234 provided with the usual pressurized air supply openings such as 30, locating pins such as 46, and centering/translation pin such as 66, which elements have not been shown in FIG. 14 for the sake of simplicity. Plate 232 may either have its own air supply or, alternatively, may have air supply passages which are normally exhausted and are connected to pressurized air supply passages (not shown) in tables 226 and 228, when table 224 is transferred into abutment therewith.

Plate 232 is slidably supported on the upper surface 236 of lower air-float plate 238, the latter being provided with a plurality of unvalved fluid supply openings (not shown) which are connected to a source of pressurized air. Plate 238 is very similar to plate 98 in FIGS. 1–3, and functions to establish a cushion of air between its upper surface 236 and the lower surface 240 of upper plate 232 so as to float plate 232 for movement in a horizontal plane in a substantially friction-free manner.

Upper plate 232 is provided with four T-slots 242, 244, 246 and 248 which slots 242 and 244 being substantially parallel and perpendicular to the forward edge 250 of table 226, and slots 246 and 248 being substantially parallel and perpendicular to the forward edge 252 of table 228. At the intersection of T-slots 242, 244, 246 and 248 there are provided smaller diameter downwardly opening recesses 254. There are also provided four downwardly facing openings 256 extending from the lower surface 240 of plate 232 to the respective upper surfaces 258 of T-slots 242, 244, 246 and 248. The diameters of openings 256 are at least as large as the width of slots 242, 244, 246 and 248.

Four dual acting T-clamps 260 are mounted within lower plate 238 and spaced apart such that they register with slots 246 and 248 and slots 242 and 244. Each of the clamps 260 comprises a larger diameter upper portion 262 slidably receivable within a pair of intersecting slots 242 and 246, 248 and 244, and 244 and 246, respectively. A tubular vertical shank portion 264 is integral with upper portion 262 and extends downwardly through the respective T-slot 242, 244, 246 and 248 into a cylinder 266 having pressurized fluid supply passages 268 and 270. Shank portion 264 is threadedly connected to piston 272, the latter being provided with a seal 274 and urged upwardly by return spring 276. A locating plunger 278 is slidably received within enlarged diameter portion 262 of clamp 260 and is urged toward its retracted position (FIG. 16) by return spring 280 acting against flange 281. Flange 281 serves as a piston slidably received within the bore 283 of shank portion 264, and is retained by snap ring 282 in bore 283. Clamps 260 are inserted into their respective T-slots 242, 244, 246 and 248 through openings 256.

The apparatus shown in FIGS. 14-17 operates in the following manner. With fluid supply passages 268 and 270 exhausted, return spring 276 will urge clamp 264 upwardly out of clamping engagement with upper plate 232 and return spring 280 will retract locating plunger 278. When a film of pressurized air is established between the respective surfaces 240 and 236 of upper and lower plates 232 and 238, upper plate 232 can be slid on this film of air rectilinearly in two orthogonal directions, one parallel to slots 242 and 244 toward table 226 and the other parallel to slots 246 and 248 toward table 228 by virtue of T-slots 242, 244, 246 and 248 sliding around and being guided by clamps 260. Slots 242, 244, 246 and 248 are sufficiently long to permit plate 232 to be transferred over into engagement with tables 226 and 228 as in the case of the embodiment shown in FIGS. 7 and 8. When plate 232 is in one of these two positions, pressurized fluid, either hydraulic or pneumatic, will be admitted to cylinder 266 through passage 268 so as to draw clamp 264 downwardly into tight frictional and clamping engagement with upper plate 232.

If it is then desired to move plate 232 into engagement with the other of the tables 226 or 228, passageway 268 will be exhausted thereby permitting return spring 276 to release clamp 264. Fluid pressure is then admitted to cylinder 266 from passageway 270 and this will drive plunger 278 upwardly so as to bias it against the upper surface 258 of the respective slot 242, 244, 246 and 248. Upper plate 232 is then slid away from the table and when recesses 254 are in alignment with the respective plungers 278, the latter will project into recesses 254 so as to stop the movement of plate 232. At this point, the operator knows that the other pair of T-slots are aligned with the clamps 260 in the other orthogonal direction, and fluid pressure will be exhausted from passageway 270 so as to permit return springs 280 to retract plungers 278 thereby permitting the table to be slid in this latter direction into engagement with the other table 226 or 228. The transfer table 27 may be installed in a similar relationship to a crane-lift station, a conveyor, or any other apparatus to or from which parts are to be transferred. Furthermore, additional tables or stations could be positioned around transfer table 224.

FIG. 18 illustrates a modification to the type of transfer system shown in FIGS. 1, 7 and 14 wherein the gap between adjacent tables 284 and 286 is sufficiently great that additional support is necessary for the upper air-float plate 288 of the dual plate table 84 when it is extended toward table 286. Such a support may comprise a bracket 290 having conveyor-type rollers 292 adapted to support and convey upper plate 288 as it is slid thereover carrying fixture plate 24 and workpiece 46. Bracket 290 may be hinged as at 294 to table 284 so as to permit its being swung out of the way when upper plate 288 is slid back on table 284. A support ledge 296 will support the distal end of bracket 290 when it is swung out into its operative position.

Although many of the details of the air-float tables and plates described in connection with the various embodiments of the present invention have not been shown in detail, reference is made to the aforementioned U.S. Pat. No. 4,058,885 which describes the structure and operation of them in further detail. In each case where a plate or table has been referred to as an air float plate or table, it should be understood that such a plate or table comprises an upper surface having openings therein leading to a source of pressurized air or connectable to a source of pressurized air so that a cushion of supporting air may be established between its upper surface and the facing lower surface of the plate or fixture supported thereby. In the case of lower plates such as plates 238, 142 and 98 in a dual-plate system, ball check valves such as 32 are not necessarily needed since the supply of air can be controlled by a master valve. In the case of the upper plates such as 146, 232 and 106, however, the openings for the supply of pressurized air to the surfaces thereof are preferably closed by ball check valves such as 32.

In most cases, the upper plates will be provided with locating pins and centering/translation pins for the accurate location of the fixture or workpiece supported thereon. The lower plates will normally only have such locating means as are necessary to establish the extended and retracted positions of the upper plate, as in the case of the embodiment of FIGS. 1-3.

The term "workpiece" is not restricted to parts to be machined, but is intended to cover tools, parts, products, components, etc., or anything which is to be worked on or transferred from one place to another. Furthermore, the term "table" is used in its broadest sense as a means for supporting an object, such as a workpiece or workpiece fixture, and includes stationary floor-mounted tables, movable plates, vehicle supported plates, etc. In some cases, it may be possible to avoid the use of fixtures, such as 24, in which case the workpiece itself could be supported directly on the upper air float plate so that the workpiece itself becomes the "fixture".

It should be noted that the present invention is not limited to systems in which the movable plate and stationary table must come into contact or, wherein the movable plate or table is necessarily exhausted until brought into contact with a stationary table or another movable table. If desired, the air supply for the movable plates could be independently controlled, or, alternatively, connected to the air supply for the stationary table by flexible hoses, or the like.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A method for transferring a workpiece fixture from one supporting table to another comprising:

providing a first table having an upwardly facing upper surface on which a transfer plate is slidably supported, said transfer plate having an upwardly facing upper surface, providing a second table having an upwardly facing upper surface horizontally spaced from the upper surface of the first table, the workpiece fixture being supported on one of the plate and second table upper surfaces, establishing a cushion of pressurized air between the plate and the upper surface of the first table so as to floatingly support the plate, sliding the plate on the cushion of air to a position in close proximity to the second table upper surface with the plate and second table upper surfaces being in vertical register.

establishing a cushion of pressurized air between the fixture and said one of said plate and said second table upper surfaces so as to floatingly support the fixture, and sliding the fixture on the last mentioned cushion of air onto the other of said plate and second table upper surfaces while at the same time providing a cushion of pressurized air between the fixture and said the other of said plate and second table upper surfaces to floatingly support the fixture as it is moved onto said the other of said plate and second table.

2. A method for transferring a workpiece fixture from one supporting table to another comprising:

providing a first table having an upwardly facing upper surface on which the fixture is supported, said fixture being captured by a capture pin projecting upwardly from the table surface and being received in an opening in the lower surface of the fixture, providing a second table spaced from the first table and having an upwardly facing upper surface;

moving one of the first and second tables toward the other of the first and second tables until the tables are in close proximity and the upper surfaces thereof are in vertical register, establishing a cushion of pressurized air between the upper surface of the first table and the fixture so as to floatingly support the fixture for substantially friction-free movement on the first table upper surface, sliding the fixture on the cushion of air from the first table to the second table while at the same time providing a cushion of pressurized air between the fixture and the second table upper surface to floatingly support the fixture as it is moved onto the second table, and when a portion of the fixture is over the second table, extending a second capture pin upwardly from the surface of the second table and into an opening in the lower surface of the fixture to capture the fixture, and then retracting the firstmentioned capture pin and sliding the fixture completely onto the second table.

3. The method of claim 2 wherein one of the first and second tables is moved by a wheeled vehicle.

4. The method of claim 2 wherein said one of said tables is a plate, and including floatingly supporting the plate on a cushion of air as it is moved toward said the other of said first and second tables.

* * * * *